United States Patent Office 3,816,531
Patented June 11, 1974

3,816,531
(2,6 - DISUBSTITUTED BENZYLIDENE)AMINO GUANIDINES AND RELATED COMPOUNDS
William F. Bruce, Havertown, and Thomas Baum, Wayne, Pa., assignors to American Home Products Corporation, New York, N.Y.
No Drawing. Continuation of abandoned application Ser. No. 60,201, July 1, 1970, which is a division of application Ser. No. 786,774, Dec. 24, 1968, which in turn is a continuation-in-part of abandoned applications Ser. No. 675,026, Oct. 13, 1967, and Ser. No. 754,494, Aug. 21, 1968. This application Aug. 10, 1972, Ser. No. 279,424
Int. Cl. C07c *129/08*
U.S. Cl. 260—564 F          1 Claim

ABSTRACT OF THE DISCLOSURE

This invention is concerned with (2,6-disubstituted benzylidene)amino guanidines and related compounds useful as hypotensive agents. Further, it relates to compositions of compounds which are useful in suppressing hypertension.

This application is a continuation of U.S. Patent Application Ser. No. 60,201, filed July 1, 1970, now abandoned, which is a division of U.S. Patent Application Ser. No. 786,774, filed Dec. 24, 1968, which in turn is a continuation-in-part of U.S. Patent Applications Ser. No. 675,026, filed Oct. 13, 1967 and Ser. No. 754,494, filed Aug. 21, 1968, both now abandoned.

BACKGROUND OF THE INVENTION

This invention relates to the field of new physiologically active (2,6-disubstituted benzylidene)amino guanidines, related compounds and the pharmacologically-acceptable acid addition salts thereof.

Aminoguanidines have been found to possess antiinflammatory activity. F. Mietzach in German Pat. 958,832 discloses (3,4-dichlorobenzylidene)amino guanidine as an antibacterial and anti-fungal agent. However, this latter compound has been found to possess weak hypotensive activity.

SUMMARY OF THE INVENTION

More particularly, this invention is directed to the new and novel compounds of the formula:

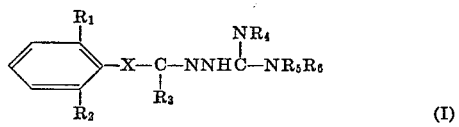

(I)

and the pharmacologically-acceptable acid addition salts thereof, wherein X is selected from the group consisting of a direct bond, methylene, ethylene and vinylene; $R_1$ and $R_2$ are selected from the group consisting of halogen, nitro, lower alkyl and lower alkoxy with the proviso that both $R_1$ and $R_2$ are not chloro when X is a direct bond; $R_3$ is selected from the group consisting of hydrogen, cyclo(lower) alkyl of about three to about five carbon atoms, lower alkyl, ethynyl and benzyl; $R_4$ and $R_5$ when taken separately are selected from the group consisting of hydrogen and lower alkyl; $R_4$ and $R_5$ when taken together with the nitrogen atoms to which they are attached form an imidazolinyl ring; and $R_6$ is selected from the group consisting of hydrogen and lower alkyl with the proviso that $R_6$ is hydrogen when $R_4$ and $R_5$ are taken together to form an imidazolinyl ring. The terms "lower alkyl," "lower alkoxy" and the like as employed herein are meant to include both branched and straight chain moieties of less than seven carbon atoms.

In the new and novel compounds of the present invention, when "X" is a "direct bond," the compounds are designated as . . . 2,6 - disubstituted phenethylidene-amino-guanidines . . . ; when "X" is "ethylene" the compounds are named . . . 3-(2,6-disubstituted)propylidene-aminoguanidines . . . ; and when "X" is "vinylene" the compounds are described as . . . 2,6-disubstituted cinnamylideneaminoguanidines. Typical examples thereof are: [(2 - chloro - 6 - fluorobenzylidene)amino] guanidine nitrate: [(2,6 - dichlorophenethylidene)amino] guanidine: ([3 - (2,6 - dichlorophenyl)propylidene]amino)guanidine; and [(2,6 - dichlorocinnamylidene)amino] guanidine.

Another new and novel object of this invention is a method for suppressing hypertension in warm-blooded animals which comprises administering to an animal in which suppression of hypertension is desired, a compound selected from the group consisting of those having the formula:

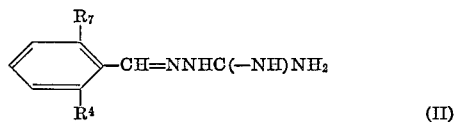

(II)

and the pharmacologically-acceptable acid addition salts thereof wherein $R_7$ and $R_8$ are both selected from the group consisting of chloro, bromo and fluoro, the amount of said compound being at least sufficient to suppress said hypertension.

Still another new and novel object of this invention is a composition for suppressing hypertension in warm-blooded animals which comprises: a hypotensive agent selected from those compounds of formula (II) and their pharmacologically-acceptable acid addition salts and an inert pharmacologically-acceptable carrier wherein the amount of hypertensive agent in said composition is at least sufficient to impart hypertensive suppressing activity thereto.

When used herein and in the appended claims the term "warm-blooded animal" includes standard laboratory test animals, such as, mice, rats, guinea pigs, dogs, monkeys and the like; valuable domestic animals, such as, cats, dogs and rabbits; and human beings. The term "hypertension" contemplates the existence of abnormally high systolic and diastolic arterial blood pressure either experimentally induced or arising from natural causes. The term "hypotensive agent" means a compound capable of lowering blood pressure which may be employed to suppress or ameliorate hypertension. The term "inert, pharmacologically-acceptable carrier" contemplates the usual and customary liquid and solid substances used to formulate unit dosage forms for pharmacological purposes.

Among the suitable acid-addition salts of the compounds (I) and the compounds of the compositions (II) of the present invention are included, *inter alia*, inorganic acids, such as the hydrohalide acids (e.g. hydrochloric and hydrobromic acids), sulphuric acid, nitric acid, and phosphoric acid, and organic acids such as lactic, fumaric, tartaric, citric, formic, acetic, glycollic, succinic, gluconic, glutaric and maleic acid.

In accord with the present invention, the compounds (I) and compositions (II) of the present invention have been found to possess interesting pharmacological properties. More particularly, these compounds (I) and compositions (II) in standard pharmacological tests, have exhibited utility as hypotensive agents in reducing high blood pressure in laboratory animals, such as, rats and dogs. In this regard, they have also exhibited psychic stimulant, antibacterial, diuretic, hyperglycemic, anti-inflammatory and tranquilizing activities.

In the pharmacological evaluation of the hypotensive compounds (I) and compositions (II) of this invention the *in vivo* effects thereof are tested by the following procedure:

Female Sprague-Dawley rats are rendered hypertensive by the application of a Figure-8 ligature to the left kidney and contralateral nephrectomy as described by Grollman, A. in Proc. Soc. Exptl. Biol. Med. *57*, 102 (1944) and Baum T. and Shropshire, A. T., in Am. J. Physiol, *212*, 1020 (1967). Systolic blood pressure is recorded indirectly from the tail using an occluding and a sensing cuff, such as, the Decker Caudal Plethysmograph made by the Decker Corp., Bala-Cynwyd, Pa., which detects changes in the volume in the tail which occurs with each heart beat. Test compounds (I) or (II) are administred orally at various concentrations with a stomach tube and pressures recorded prior to dosing and 1.5, 4 and sometimes 24 hours thereafter.

The compounds (I) and (II) of this invention in the above test procedure, when administered orally at a dosage range of about 1 mg. to about 70 mg./kilo of body weight reduce the blood pressure an average of about 20 to about 60 mm. Hg. In this regard, particularly effective results are afforded by [(2,6 - dichlorobenzylidene)amino]guanidine acetate (II) and [(2 - chloro-6-fluorobenzylidene)amino]guanidine nitrate (I), as shown, in hereinafter Table I which lists the maximum changes in pressure in rats that are encountered at any of the three observation periods regardless of the time of occurence, although those peaks are usually observed at 1.5 hours.

TABLE I

| Compound | Dose (mg./kg.) | Number of rats | Blood pressure control | Change (mm. Hg) |
|---|---|---|---|---|
| [(2-6-dichlorobenzylidene) aminoguanidine acetate | 1 | 12 | 174 | −29 |
| | 2 | 11 | 183 | −34 |
| | 3 | 11 | 185 | −54 |
| | 4 | 8 | 183 | −43 |
| [(2-chloro-6-fluorobenzylidene)- aminoguanidine nitrate | 7.5 | 4 | 194 | −39 |
| | 10 | 4 | 178 | −51 |

The *in vivo* activity of [(2,6 - dichlorobenzylidine)amino]guanidine acetate was also tested by the following procedure:

Hypertension is produced in dogs by a three-stage procedure, each performed under pentobarbital anesthesia (35 mg./kg.). The carotid artery bifurcations are exposed by two incisions and the sinuses denervated by stripping the adventitia in the region. The right renal artery is exposed by a flank incision and constricted by a silver Goldblatt clamp. Finally, the left kidney is removed. The systolic/diastolic blood pressure is recorded indirectly from the tail with a condenser microphone by the method described by Prioli, N. D. and Winbury, M. M., in J. Appl. Physicol. 15:323 (1960). [(2,6 - dichlorobenzylidene)amino]guanidine acetate is administered to four groups of hypertensive dogs: intraperitoneally at doses of 0.5, 1.0 and 2.5 mg./kg. and orally at 5 mg./kg. and the blood pressure is recorded at two and four hours. The results are hereinafter set-forth in the following table:

The compounds (I) and compositions (II) of the present invention can be prepared and administered to warm-blooded animals in a wide variety of oral and parenteral dosage forms.

For preparing compositions from the physiologically active compounds (I) and (II) of this invention, inert, pharmacologically-acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents; it can also be an encapsulating material. In powders the carrier is a finely divided solid which is in admixture with the finely divided compound. In the tablet the compound is mixed with carrier having the necessary binding properties in suitable proportions and compacted in the shape and size desired. The powders and tablets preferably contain from 5 or 10 to 99 percent of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets, capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methyl cellulose, sodium carboxymethyl cellulose and other well known suspending agents.

Preferably, the pharmacological preparation is in unit dosage form. In such form, the preparation is sub-divided in unit doses containing appropriate quantities of the compound, the unit dosage form can be a packaged preparation, the package containing discrete quantities of preparation, for example, packeted powders of vials or ampoules.

The unit dosage form can also be a capsule, cachet or tablet itself or it can be the appropriate number of any of these in packaged form. The quantity of compound in a unit dose of preparation may be varied or adjusted from a 1 mg. to 100 mg. according to the particular application and the potency of the active ingredient.

In therapeutic use as hypotensive agents, the compounds (I) of this invention and the compounds of the compositions (II) of this invention are administered at the initial dosage of about 0.1 mg. to 10 mg. per kilogram daily. The dosages, however, may be varied depending upon

TABLE II

| Compound | Dose (mg./kg.) | Route | Number of dogs | Blood pressure control | Change (mm. Hg) | Heart rate (beats/min.) Control | Change |
|---|---|---|---|---|---|---|---|
| [(2,6-dichlorobenzylidene)-aminoguanidine acetate | 0.5 | I.p. | 4 | 204/131 ±8/6 | −28/−21 ±11/9 | 102±6 | −50±12 |
| | 1 | I.p. | 4 | 204/137 ±10/9 | −31/−17 ±6/8 | 111±10 | −65±7 |
| | 2.5 | I.p. | 4 | 190/135 ±7/8 | −31/−32 ±5/9 | 92±9 | −45±7 |
| | 5 | I.p. | 5 | 202/127 ±9/5 | −26/−34 ±9/11 | 103±7 | −55±9 |

In the above test, all doses of [(2,6-dichlorobenzylidene)amino]guanidine acetate significantly lowered blood pressure and decreased heart rate whether administered intraperitoneally or orally.

the requirements of the animal, the compound [(I) and (II)] employed and the particular subject being treated. Generally, treatment is initiated with smaller dosages which are less than the optimum dose of the compound.

Thereafter, the dosage is increased by small increments until the optimum effect under the circumstances is reached. In general, these compounds [(I) and (II)] are administered at a concentration level that will generally afford effective results without causing any harmful or deleterious side effects within the range of from about 0.1 mg. to about 70 mg. per kilo. In particular, [(2,6-dichlorobenzylidene)amino]guanidine which has hereinabove been shown to possess outstanding hypotensive activity may be employed in warm-blooded animals at a range from about 0.1 to about 10 mg. per kilo per day, although as aforementioned variations will occur. However, a dosage level that is in the range of from about 0.05 mg. to about 2.5 mg. per kilo per day is most desirably employed in order to achieve effective results.

In a related aspect, novel and useful compositions are provided by admixing the active compound of this invention with an animal feed. Suitable feeds are described in the book "Feeds and Feeding" by F. B. Morrison, published by Morrison Publishing Co., Ithaca, New York (1948).

DESCRIPTION OF THE PREFERRED EMBODIMENTS

The compounds of this invention (I) and of the compositions of this invention (II) may be prepared in accordance with the following reaction scheme:

$$\text{(A)} \quad \underset{R_{10}}{\underset{|}{\overset{R_9}{\overset{|}{\underset{}{\bigcirc}}}}}-X-\underset{R_3}{\underset{|}{C}}=O \;+\; H_2NNH-\overset{NR_4}{\overset{\|}{C}}-NR_5R_6 \quad \text{(B)}$$

$$\downarrow$$

$$\underset{R_{10}}{\underset{|}{\overset{R_9}{\overset{|}{\underset{}{\bigcirc}}}}}-X-\underset{R_3}{\underset{|}{C}}=NNH\overset{NR_4}{\overset{\|}{C}}-NR_5R_6 \quad \text{(III)}$$

where $R_3$, $R_4$, $R_5$, $R_6$ and X are defined as above and $R_9$ and $R_{10}$ are selected from the group consisting of halogen, nitro, lower alkyl and lower alkoxy. According to a feature of the invention the 2,6-substituted phenyl carbonyl compound (A) is treated with an aminoguanidine (B) to yield the physiologically active compounds of formula (III).

Many of the 2,6-disubstituted phenyl carbonyl (A) starting compounds are commercially available and may also be prepared by any conventional method such as described in C.A. 62, 9954f and 57, 1368C. The alkyl substituted aminoguanidines (B) employed as reactants herein may be prepared by the process described in J. Med. Chem. 6, 283 (1963) while 2-(2-imidazolin-2-yl)hydrazine may be prepared by the process described in J. Org. Chem. 18, 790 (1953).

The following examples are given by way of illustration and are not to be construed as limitations of this invention, many variations of which are possible without departing from the scope and spirit thereof.

EXAMPLE 1

[(2,6-dichlorobenzylidene)amino]guanidine acetate

A solution of 4.5 g. of 2,6-dichlorobenzaldehyde in 20 ml. of ethanol is added to a solution of 3.5 g. of aminoguanidine bicarbonate in 40 ml. of water and 2.5 ml. of acetic acid. An oil separated which gradually dissolved when the solution is heated on a steam bath. After an hour, the solution is filtered and concentrated to a half volume in a crystallizing dish, 5.5 g. of solid [(2,6-dichlorobenzylidene)amino]guanidine acetate, having a melting point 192–3° C. d. was recovered.

*Analysis.*—Calcd. for $C_8H_8Cl_2N_4 \cdot C_2H_4O_2$: C, 41.25; H, 4.16; Cl, 24.36; N, 19.25. Found: C, 41.11; H, 4.23; Cl, 24.55; N, 19.21.

Similarly, by following the procedure of Example 1, but substituting another organic acid or inorganic acid for acetic acid there is obtained the corresponding acid-addition salt.

EXAMPLE 2

[(2-chloro-6-fluorobenzylidene)amino]guanidine nitrate

Following the procedure of Example 1, but substituting 2-chloro-6-fluorobenzaldehyde for 2,6-dichlorobenzaldehyde and nitric acid for acetic acid there is obtained [(2-chloro-6-fluorobenzylidene)amino]guanidine nitrate, having a melting point of 222–3° C. d.

*Analysis.*—Calcd. for $C_8H_8ClFN_4 \cdot HNO_3$: C, 34.61; H, 3.27; N, 25.23; Cl, 12.77. Found: C, 34.51; H, 3.30, N, 25.98; Cl, 13.03.

EXAMPLE 3

[(2,6-dibromo-α-methylbenzylidene)amino]guanidine acetate

Following the procedure of Example 1, but substituting 2,6-dibromoacetophenone for 2,6-dichlorobenzaldehyde there is obtained [(2,6-dibromo-α-methylbenzylidene)amino]guanidine acetate.

EXAMPLE 4

[(2,6-difluoro-α-ethylbenzylidene)amino]guanidine acetate

Following the procedure of Example 1, but substituting 2,6-difluoropropiophenone for 2,6-dichlorobenzaldehyde there is obtained [(2,6-difluoro-α-ethylbenzylidene)amino]guanidine acetate.

EXAMPLE 5

[(2,6-dichloro-α-benzylbenzylidene)amino]guanidine acetate

Following the procedure of Example 1, but substituting 2,6-dichloro-α-phenyl-acetophenone for 2,6-dichlorobenzaldehyde there is obtained [(2,6-dichloro-α-benzylbenzylidene)amino]guanidine acetate.

EXAMPLE 6

[(2,6-dichloro-α-allylbenzylidene)amino]guanidine acetate

Following the procedure of Example 1, but substituting 2,6-dichloro-α-vinyl-acetophenone for 2,6-dichlorobenzaldehyde there is obtained [(2,6-dichloro-α-allylbenzylidene)amino]guanidine acetate.

EXAMPLE 7

[(2,6-dichloro-α-ethynylbenzylidene)amino]guanidine acetate

Following the procedure of Example 1, but substituting 2,6-dichloropropiolophenone for 2,6-dichlorobenzaldehyde there is obtained [(2,6-dichloro-α-ethynylbenzylidene)amino]guanidine acetate.

EXAMPLE 8

[(2,6-dichloro-α-propylbenzylidene)amino]guanidine acetate

Following the procedure of Example 1, but substituting 2,6-dichlorobutyrophenone for 2,6-dichlorobenzaldehyde there is obtained [(2,6-dichloro-α-propylbenzylidine)amino]guanidine acetate.

EXAMPLE 9

[(2,6-dichloro-α-cyclopropylbenzylidene)amino]guanidine acetate

Following the procedure of Example 1, but substituting 2,6-dichlorocyclopropiophenone for 2,6-dichlorobenzaldehyde there is obtained [(2,6-dichloro-α-cyclopropylbenzylidene)amino]guanidine acetate

EXAMPLE 10

[(2,6-dimethyl-α-cyclobutylbenzylidene)amino] guanidine hydrochloride

Following the procedure of Example 1, but substituting 2,6-dimethylcyclobutyrophenone for 2,6-dichlorobenzaldehyde and hydrochloric acid for acetic acid there is obtained [(2,6 - dimethyl-α-cyclobutylbenzylidene)amino] guanidine hydrochloride.

EXAMPLE 11

[(2,6-dimethoxy-α-cyclopentylbenzylidene)amino] guanidine sulfate

Following the procedure of Example 1, but substituting 2,6-dimethoxycyclopentiophenone for 2,6-dichlorobenzaldehyde and sulfuric acid for acetic acid there is obtained [(2,6 - dimethoxy - α - cyclopentylbenzylidene)amino] guanidine sulfate.

EXAMPLE 12

Repeating the procedure of the prior Examples with appropriate reactants, acid addition salts of the compounds designated by the following structural formula were prepared:

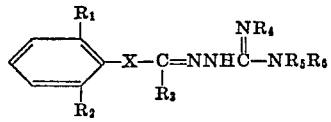

wherein in each compound the substituents are defined as follows:

| R₁ | R₂ | R₃ | R₄ | R₅ | R₆ | X |
|---|---|---|---|---|---|---|
| F | F | H | H | H | H | |
| CH₃ | CH₃ | C₅H₁₁ | H | H | H | |
| Cl | Cl | H | H | H | CH₃ | |
| C₂H₅ | C₂H₅ | H | CH₃ | CH₃ | CH₂ | |
| Cl | Cl | H | H | H | H | CH—CH |
| Br | Br | CH₃ | C₂H₅ | H | C₂H₅ | |
| NO₂ | NO₂ | H | H | C₃H₇ | H | |
| C₃H₇ | C₃H₇ | H | CH₃ | H | CH₃ | |
| Cl | Cl | H | H | H | H | CH₂ |
| C₂H₅O | C₂H₅O | C₂H₅ | H | H | C₄H₉ | |
| Br | Br | H | H | H | H | |
| CH₃O | CH₃O | H | C₃H₇ | H | H | |
| Cl | Cl | H | H | H | H | CH₂CH₂ |
| Cl | Br | H | H | H | H | |
| Br | F | H | H | H | H | |

EXAMPLE 13

Following the procedure of Example 1, but substituting 2-(2-imidazolin-2-yl)hydrazine hydrochloride for aminoguanidine and hydrochloric acid for acetic acid there is obtained 2,6-dichlorobenzaldehyde, (2-imidazolin-2-yl) hydrazone.

Similarly, the following compounds are prepared:

2,6-dibromobenzaldehyde, (2-imidazolin-2-yl)hydrazone;
2,6-dimethylbenzaldehyde, (2-imidazolin-2-yl)hydrazone; and
2,6-dimethoxybenzaldehyde, (2-imidazolin-2-yl) hydrazone.

EXAMPLE 14

Repeating the procedure of Example 1, the following compounds are prepared:

[(2,6-dimethyl-β-cyclopropylphenethylidene)amino] guanidine;
[(2,6-diethoxy-β-methylphenethylidene)amino] guanidine;
[(2,6-dibromophenethylidene)amino]guanidine;
[(3-(2,6-diethylphenyl-γ-methylpropylidene]amino) guanidine;
[(3-(2,6-dibromophenyl)propylidene]amino)guanidine;
[(2,6-dimethoxycinnamylidene)amino]guanidine; and
[(2,6-dimethylcinnamylidene)amino]guanidine.

It is understood that by conventional methods the compounds of Examples 1 through 14 may be converted to their base form or to other acid-addition salts. Typically, the bases may be prepared by contacting an ethanol-water mixture containing an appropriate compound of this invention with ammonium hydroxide to afford the corresponding base.

EXAMPLE 15

A unit liquid dosage composition suitable for oral or parenteral administration is prepared by admixing one gram of [(2,6-dichlorobenzylidene)amino]guanidine acetate in sufficient sterile distilled water containing 0.5% by weight of carboxymethylcellulose to make 100 ml. This admixture may then be flavored for oral use or filled aseptically into sterile ampules which are then flame sealed, sterilized, and stored under refrigeration until used.

Similarly, oral and parenteral liquid compositions of the following hypotensive agents are prepared:

[(2,6-dibromobenzylidene)amino]guanidine;
[(2,6-difluorobenzylidene)amino]guanidine;
[(2-chloro-6-fluorobenzylidene)amino]guanidine nitrate;
[(2-chloro-6-bromobenzylidene)amino]guanidine; and
[(2-bromo-6-fluorobenzylidene)amino]guanidine.

EXAMPLE 16

The tablets and capsules for oral use are prepared with the following formulations:

| ngredients | Milligrams | | | | | |
|---|---|---|---|---|---|---|
| I(2,6-dichlorobenzylidene) amino] guanidine acetate | 1 | 10 | 15 | 25 | 50 | 100 |
| Lactose | 296 | 287 | 282 | 272 | 247 | 197 |
| Magnesium stearate | 3 | 3 | 3 | 3 | 3 | 3 |
| Total | 300 | 300 | 300 | 300 | 300 | 300 |

Similarly, tablets and capsules of the following hypotensive agents are prepared:

[(2,6-dibromobenzylidene)amino]guanidine;
[(2,6-difluorobenzylidene)amino]guanidine;
[(2-chloro-6-fluorobenzylidene)amino]guanidine nitrate;
[(2-chloro-6-bromobenzylidene)amino]guanidine; and
[(2-bromo-6-fluorobenzylidene)amino]guandine.

EXAMPLE 17

Repeating the procedures of Examples 15 and 16, capsules, tablets and liquid compositions of the hypotensive agents described in Examples 3 to 14 are prepared.

What is claimed is:

1. [(2,6-dichloro - α - cyclopropylbenzylidene)amino] guanidine.

References Cited

UNITED STATES PATENTS 3,657,337  4/1972  Houlihan et al. ____ 260—564 F

FOREIGN PATENTS 1,223,491  2/1971  Great Britain _____ 260—564 F
1,223,492  2/1971  Great Britain _____ 260—564 F
1,223,493  2/1971  Great Britain _____ 260—564 F LEON ZITVER, Primary Examiner G. A. SCHWARTZ, Assistant Examiner U.S. Cl. X.R.

260—309.6, 501.14; 424—273, 316, 326